(12) United States Patent
Sharifi et al.

(10) Patent No.: US 12,367,875 B2
(45) Date of Patent: Jul. 22, 2025

(54) SELECTING BETWEEN MULTIPLE AUTOMATED ASSISTANTS BASED ON INVOCATION PROPERTIES

(71) Applicant: GOOGLE LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 256 days.

(21) Appl. No.: 17/550,060

(22) Filed: Dec. 14, 2021

(65) Prior Publication Data

US 2023/0186909 A1 Jun. 15, 2023

Related U.S. Application Data

(60) Provisional application No. 63/288,795, filed on Dec. 13, 2021.

(51) Int. Cl.
*G10L 15/22* (2006.01)
*G10L 15/02* (2006.01)
*G10L 15/08* (2006.01)

(52) U.S. Cl.
CPC .............. *G10L 15/22* (2013.01); *G10L 15/02* (2013.01); *G10L 15/08* (2013.01)

(58) Field of Classification Search
CPC .......... G10L 15/22; G10L 15/02; G10L 15/08
See application file for complete search history.

(56) References Cited

U.S. PATENT DOCUMENTS

| 11,783,831 B1 * | 10/2023 | Lantin ...................... H04L 9/14 |
| | | 704/275 |
| 2017/0060839 A1 | 3/2017 | Kawamura |
| 2017/0300831 A1 * | 10/2017 | Gelfenbeyn ........... G06N 3/004 |
| 2018/0130469 A1 * | 5/2018 | Gruenstein ............. G10L 15/08 |
| 2018/0278750 A1 | 9/2018 | Avila |

(Continued)

FOREIGN PATENT DOCUMENTS

| WO | 2018164781 A1 | 9/2018 |
| WO | 2019212697 | 11/2019 |

OTHER PUBLICATIONS

European Patent Office; International Search Report and Written Opinion issued in Application No. PCT/US2022/042726; 23 pages; dated Feb. 24, 2023.

(Continued)

*Primary Examiner* — Hai Phan
*Assistant Examiner* — Alvin Iskender
(74) *Attorney, Agent, or Firm* — Gray Ice Higdon

(57) ABSTRACT

Systems and methods for determining, based on invocation input that is common to multiple automated assistants, which automated assistant to invoke in lieu of invoking other automated assistants. The invocation input is processed to determine one or more invocation features that may be utilized to determine which, of a plurality of candidate automated assistants, to invoke. Further, additional features are processed that can indicate which, of the plurality of invocable automated assistants, to invoke. Once an automated assistant has been invoked, additional audio data and/or features of additional audio data are provided to the invoked automated assistant for further processing.

20 Claims, 6 Drawing Sheets

(56) References Cited

U.S. PATENT DOCUMENTS

| | | |
|---|---|---|
| 2018/0286414 A1 | 10/2018 | Ravindran |
| 2018/0324115 A1 | 11/2018 | Aggarwal et al. |
| 2018/0336045 A1 | 11/2018 | Badr |
| 2018/0336892 A1* | 11/2018 | Kim ..................... H04R 3/005 |
| 2021/0090572 A1* | 3/2021 | Mahmood ............... G06F 3/167 |
| 2021/0289607 A1 | 9/2021 | Wilberding |
| 2021/0358487 A1* | 11/2021 | Camenares ............. G10L 15/22 |
| 2022/0180867 A1* | 6/2022 | Bobbili .................. G10L 15/30 |

OTHER PUBLICATIONS

European Patent Office; Invitation to Pay Additional Fees issued in Application No. PCT/US2022/042726; 15 pages; dated Jan. 3, 2023.

European Patent Office, Intention to Grant issued in Application No. 22783119.5; 43 pages; dated Jan. 2, 2025.

\* cited by examiner

SELECTING BETWEEN MULTIPLE AUTOMATED ASSISTANTS BASED ON INVOCATION PROPERTIES

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input. An automated assistant responds to a request by providing responsive user interface output, which can include audible and/or visual user interface output.

As mentioned above, many automated assistants are configured to be interacted with via spoken utterances, such as an invocation indication followed by a spoken query. To preserve user privacy and/or to conserve resources, a user must often explicitly invoke an automated assistant before the automated assistant will fully process a spoken utterance. The explicit invocation of an automated assistant typically occurs in response to certain user interface input being received at a client device. The client device includes an assistant interface that provides, to a user of the client device, an interface for interfacing with the automated assistant (e.g., receives spoken and/or typed input from the user, and provides audible and/or graphical responses), and that interfaces with one or more additional components that implement the automated assistant (e.g., remote server device(s) that process user inputs and generate appropriate responses).

Some user interface inputs that can invoke an automated assistant via a client device include a hardware and/or virtual button at the client device for invoking the automated assistant (e.g., a tap of a hardware button, a selection of a graphical interface element displayed by the client device). Many automated assistants can additionally or alternatively be invoked in response to one or more spoken invocation phrases, which are also known as "hot words/phrases" or "trigger words/phrases". For example, a spoken invocation phrase such as "Hey Assistant," "OK Assistant", and/or "Assistant" can be spoken to invoke an automated assistant. Also, for example, an assistant may be invoked based on one or more gestures of the user, such as pressing a button on a device and/or motioning in a particular manner such that the motion can be captured by a camera of a device.

Often, a client device that includes an assistant interface includes one or more locally stored models that the client device utilizes to monitor for an occurrence of a spoken invocation phrase. Such a client device can locally process received audio data utilizing the locally stored model, and discards any audio data that does not include the spoken invocation phrase. However, when local processing of received audio data indicates an occurrence of a spoken invocation phrase, the client device will then cause that audio data and/or following audio data to be further processed by the automated assistant. For instance, if a spoken invocation phrase is "Hey, Assistant", and a user speaks "Hey, Assistant, what time is it", audio data corresponding to "what time is it" can be processed by an automated assistant based on detection of "Hey, Assistant", and utilized to provide an automated assistant response of the current time. If, on the other hand, the user simply speaks "what time is it" (without first speaking an invocation phrase or providing alternate invocation input), no response from the automated assistant will be provided as a result of "what time is it" not being preceded by an invocation phrase (or other invocation input).

SUMMARY

Techniques are described herein for selecting, from multiple candidate automated assistants, a particular automated assistant to invoke for processing a request when an invocation is received that is capable of selectively invoking any of the multiple candidate automated assistants. Put another way, according to techniques disclosed herein in some situations the invocation, when received, can result in invocation of the particular automated assistant exclusively, while in other situations the invocation, when received, can result in the invocation of an alternate automated assistant, of the multiple candidate automated assistants, exclusively. For example, various techniques are directed to utilizing a general automated assistant, which can receive an invocation from a user, to determine which of a plurality of secondary automated assistants to invoke based on features of the invocation and/or based on features of audio data that is provided with the invocation. For instance, the user can utter a general invocation phrase, such as "OK Assistant", that is capable of invoking both a first automated assistant and a second automated assistant. The general automated assistant can determine, based on one or more features of the invocation, features of a query provided by the user, and/or additional features other than speech recognition of any voice input (e.g., invocation voice input and/or query) to determine whether to invoke and subsequently provide the query to the first automated assistant in lieu of invoking and providing the query to the second automated assistant.

As an example, the user may have a device that has multiple automated assistants installed on the client device (e.g., at least client applications for the multiple automated assistants). Both a first automated assistant and a second automated assistant executing on the device are capable of being invoked with the invocation phrase "OK Assistant." The invocation input of "OK Assistant" can be processed to determine, based on one or more features of the invocation input (e.g., prosodic features, usage of vocabulary) whether to invoke the first automated assistant or the second automated assistant. Also, for example, one or more other features, other than speech recognition features (e.g., other applications executing by the client device, location of the client device, a classification of the location where the device is located, presence of others in proximity to the client device), can be processed to determine whether to invoke the first automated assistant or the second automated assistant.

As another example, the user may have a client device that has a first instantiation of an automated assistant installed on the device and a second instantiation of the same automated assistant installed on the same device. For example, the user may have a "home" automated assistant that the user utilizes when in a home setting and a "work" automated assistant instantiation that the user utilizes when in a work setting. The invocation input of "OK Assistant" may be capable of invoking both the "home" assistant and the "work" assistant, and the invocation input can be processed to determine, based on one or more features as described herein, whether to invoke the "home" instantiation or the "work" instantiation. A location can be a geographical location and/or can be a classification of the location of the client device, such as "public" versus "private" location.

Thus, utilization of techniques described herein mitigates occurrences of users inadvertently initially invoking incorrect automated assistant(s) in attempting to invoke an intended automated assistant. By mitigating instances where an unintended automated assistant is invoked inadvertently by the user, utilization of computational and/or network resources is mitigated as the computational and/or network resource(s), that would otherwise be utilized if the unintended automated assistant was invoked, are not utilized. Further, by accommodating a single invocation that can be utilized by multiple automated assistants, the quantity of inputs and/or duration of input(s) from a user to invoke a particular automated assistant can be reduced, thereby reducing processing time and memory resources. Thus, a user can utilize a single invocation to selectively invoke one of a plurality of automated assistants without requiring additional input from the user specifying which of the plurality of automated assistants the user is intending to invoke. Yet further, by accommodating a single invocation that can be utilized by multiple automated assistants, the need to load and/or utilize multiple invocation models, each being used in monitoring for invocation(s) for a respective automated assistant, can be reduced or eliminated. For example, having a first hot word detection model for a first automated assistant and a second hotword detection model for a second automated assistant continuously loaded and continuously being utilized can consume more processor, memory resources, and power than having a general hot word detection model loaded and utilized. Also, for example, having multiple hotword detection models that monitor for multiple phrases can result in higher incidences of false positive detection of hotwords, thus unnecessarily consuming resources. Moreover, digital signal processors (DSPs) of a client device are often utilized to process audio data utilizing hot word detection model(s). DSPs can have constrained memory and/or processor resources, preventing multiple hot word detection models from being loaded and/or executed in parallel (or at least preventing that without also having to forego not executing other process(es) on the DSP).

In some implementations, a first assistant and a second assistant can both be configured to be invoked by the same invocation. In some implementations, the invocation can be a spoken utterance from the user that indicates which automated assistant, of a plurality of automated assistants, the user has interest in providing a spoken query. For example, both the first and second automated assistant can be invoked by the invocation phrase "OK Assistant." In some implementations, the invocation can be an action from the user. For example, both the first and second automated assistant can be invoked by the user performing a particular gesture, pressing a button on the client device, looking at the client device, and/or one or more other actions that can be captured by one or more cameras of the client device.

In some implementations, the invocation is received and/or detected by a general automated assistant that is not configured to generate responses to a query. For example, the general automated assistant can be a "meta assistant" that is configured to receive invocation input, process the invocation input to determine which of a plurality of secondary automated assistants to invoke based on one or more features, and invoke the intended secondary automated assistant. Thus, the invocation input, and/or additional audio input that precedes and/or follows the invocation input, can be processed before providing the invocation input and/or additional audio data to a secondary automated assistant for further processing.

In some implementations, one or more invocation features of the invocation input can be processed to determine whether to invoke a first automated assistant or a second automated assistant. For example, one or more prosodic features of spoken invocation input, determined from the audio data detected by one or more microphones of the client device, can be utilized to determine whether to invoke the first automated assistant or the second automated assistant. By processing invocation input to determine prosodic features of the audio input (e.g., tone, speech rate), a first automated assistant can be invoked in lieu of invoking a second automated assistant based on determining that the prosodic features that are detected in the audio data are more likely to be present in invocations of the first automated assistant than in invocations of the second automated assistant.

In some implementations, one or more additional features detected by the client device can be processed, either in addition to the invocation input features or in lieu of the invocation input features, to determine whether to invoke the first automated assistant or the second automated assistant. Additional features that are processed to determine whether to invoke the first automated assistant or the second automated assistant can be in addition to any automatic speech recognition features of the invocation input. For example, additional features can include one or more terms that are utilized by the user in a query that precedes or follows the invocation input that are more likely to be utilized when invoking (and/or providing a query) to a "home" automated assistant over invoking (and/or providing a query) to a "work" automated assistant.

In some implementations, the one or more additional features can include one or more applications that are executing (or that have recently been accessed and/or executed) by the client device when the invocation input is detected. For example, a client device may be executing a calendar application that includes calendar information for the "work" profile of a user. When invocation input is detected that can invoke both a "work" automated assistant and a "home" automated assistant, the "work" automated assistant may be invoked based on a likelihood that the user is currently engaged in work activities. Also, for example, a client device may be executing a game, a web browser, and/or other application that would more likely to accessed by the user in a non-work setting, and a non-work profile of an automated assistant may be invoked in lieu of invoking a "work" profile of the automated assistant.

In some implementations, the one or more additional features can include location information related to the location of the client device when the invocation input is detected. In some implementations, a location can be a physical location of the client device, such as the geographic location of the device. In some implementations, the location can be a classification of a location, such as a "public" location versus a "private" location. In some implementations, then location can be a specific area within a geographic location, such as "living room" and "home office." Location classifications can be set as user preferences by the user and/or can be determined based on past interactions of the user with the client device (e.g., locations where the user commonly utilizes a "work" calendar can be classified as "work" or "private" locations).

In some implementations, one or more additional features can include visual input features that are captured by one or more cameras of the client device when the invocation input is detected. For example, visual input that is received during the invocation input can indicate the presence of others in proximity to the client device. In response, a "public" automated assistant can be invoked in lieu of invoking a "private" automated assistant. Also, for example, visual input may indicate that the user is in a home setting and invoke a "home" automated assistant in lieu of invoking a "work" automated assistant.

In some implementations, the user may be provided with an indication of the automated assistant that was invoked by the invocation input. For example, the user may be provided, via an interface of the client device, with an indication that a "work" automated assistant has been invoked. Also, for example, the user may be provided with an audio indication that a first automated assistant has been invoked in lieu of invoking a second automated assistant. For example, the user may be provided with an audio indication of "Invoking your work assistant" when a "work" automated assistant has been invoked in lieu of invoking a "home" automated assistant. Also, for example, one or more audio prompts and/or responses from an invoked automated assistant can be provided using a different voice profile such that the user can differentiate between multiple automated assistants and/or profiles (e.g., a synthesized male voice for a "home" automated assistant and a synthesized female voice for a "work" automated assistant).

In some implementations, one or more machine learning models can be utilized to process features of the invocation input and/or one or more additional features. Invocation input, audio data received with the invocation input, and/or visual data that is received with the invocation input can be utilized to generate one or more vectors in an embedding space that indicate the location information, prosodic features of the input, and/or other features described herein. The vector can be processed utilizing a machine learning model that can generate, as output, probabilities (and/or other indications) of whether to invoke a first automated assistant in lieu of invoking a second automated assistant.

In some implementations, the user may provide feedback (e.g., additional audio feedback and/or visual feedback) that indicates whether the invoked automated assistant was the intended automated assistant to be invoked. In response to negative feedback, the non-invoked automated assistant can be invoked and one or more of the features that were processed to invoke the first automated assistant can be provided to the machine learning model as training data for further training based on the negative feedback. For example, a user may utter an invocation phrase of "OK Assistant," which may invoke both a first and a second automated assistant. Based on the invocation features and/or additional features, the first automated assistant can be invoked. The user may have instead intended to invoke the second automated assistant, and respond to the invoked automated assistant with "Use the second automated assistant instead." In response, the second automated assistant can be invoked, and the originally provided invocation input can be utilized to further train the associated machine learning model so that future invocations with the same features are less likely to result in the first automated assistant being invoked.

In some implementations, the invocation input can be processed and any additional audio data that is captured immediately preceding or following the invocation input can be provided to the invoked automated assistant without further processing. For example, the client device may detect audio data that includes an invocation phrase and, based on the invocation features and/or additional features, as described herein, invoke the first automated assistant. To minimize latency in processing additional input (e.g., a query that precedes and/or follows the invocation), the audio data that precedes and/or follows the invocation input can be directly provided to the invoked automated assistant. The invoked automated assistant can then process the audio data, such as performing natural language processing, automatic speech recognition, STT, and/or other processing to generate a response and/or perform an action based on the provided input.

In some implementations, the invocation input can be processed and any additional audio data that is captured immediately preceding or following the invocation input can be further processed to determine one or more features before the audio data is provided to the invoked automated assistant. For example, a general automated assistant can receive the invocation input and/or additional audio input that precedes and/or follows the invocation input. Based on the invocation features and/or additional features, a first automated assistant can be invoked. The general automated assistant can perform, for example, automatic speech recognition, natural language processing, and/or other processing of the invocation input and/or additional input on the input from the user, and detected features and/or processed input can be provided with the audio data (or in lieu of the audio data) to the invoked automated assistant.

The above description is provided as an overview of some implementations of the present disclosure. Further description of those implementations, and other implementations, are described in more detail below.

DETAILED DESCRIPTION

Figure 1:
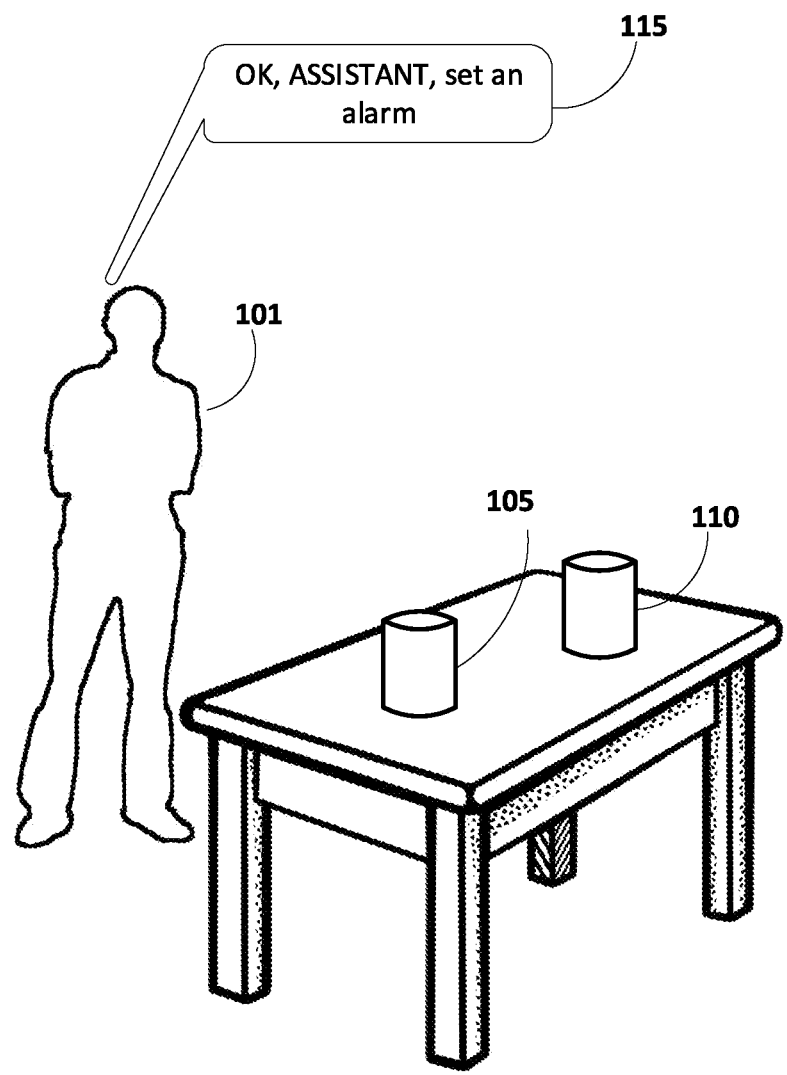
FIG. 1 is an illustration of an example environment in which implementations disclosed herein can be implemented.

Referring to FIG. 1, an example environment is provided which includes multiple automated assistants that may be invoked by a user 101. The environment includes a first standalone interactive speaker 105 with a microphone (not depicted) and a camera (also not depicted), and a second standalone interactive speaker 110 with a microphone (not depicted) and a camera (also not depicted). The first speaker may be executing, at least in part, a first automated assistant that may be invoked with an invocation phrase. The second speaker 110 may be executing a second automated assistant that may be invoked with an invocation phrase, either the same invocation phrase as the first automated assistant or a different phrase to allow the user, based on the phrase uttered, to select which automated assistant to invoke. In the example environment, the user 101 is speaking a spoken utterance 115 of "OK Assistant, What's on my calendar" in proximity to the first speaker 105 and the second speaker 110. If one of the first and/or second automated assistants is configured to be invoked by the phrase "OK Assistant," the invoked assistant may process the query that follows the invocation phrase (i.e., "What's on my calendar"). In some implementations, one or both of the automated assistants 105 and 110 can be capable to be invoked by the user performing one or more actions that can be captured by the cameras of the automated assistants. For example, automated assistant 105 can be invoked by the user looking in the direction of automated assistant 105, making a waving motion in the direction of automated assistant 105, and/or one or more other actions that can be captured by the camera of automated assistant 105.

Figure 2:
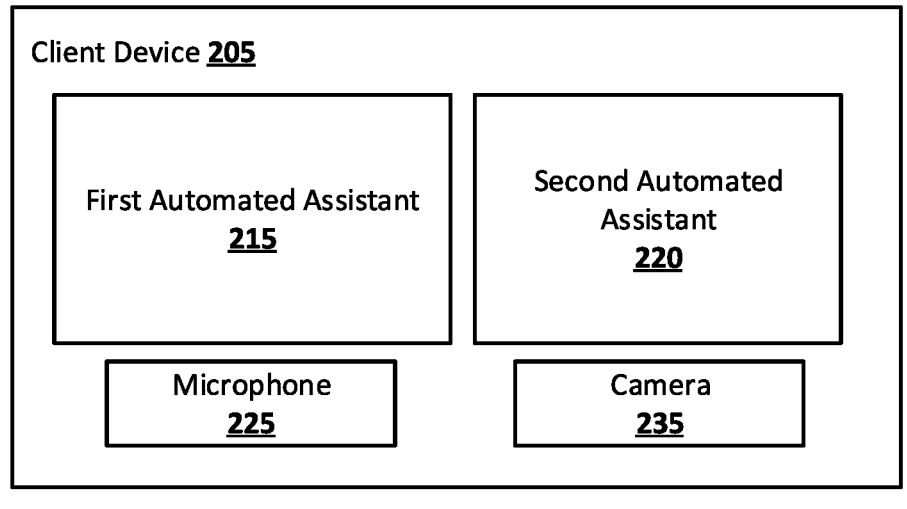
FIG. 2 is a block diagram of an example environment in which various methods disclosed herein can be implemented.
Figure 2:
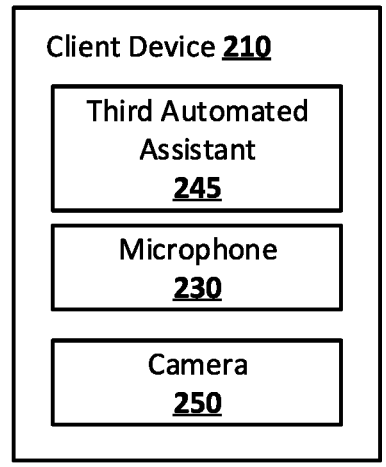

In some implementations, a device, such as first speaker 105, may be executing multiple automated assistants. Referring to FIG. 2, an example environment is illustrated that includes multiple client devices executing multiple automated assistants. The system includes a first client device 105 that is executing a first automated assistant 215 and a second automated assistant 220. Each of the first and second automated assistants may be invoked by uttering an invocation phrase (unique to each assistant or the same phrase to invoke both assistants) proximate to the client device 105 such that the audio may be captured by a microphone 225 of client device 105 and/or performing an action that may be captured by camera 235 of client device 105. For example, user 101 may invoke the first automated assistant 215 by uttering "OK Assistant 1" in proximity to the client device 105, and further invoke the second automated assistant 220 by uttering the phrase "OK Assistant 2" in proximity to client device 105. Further, user 101 may invoke the first automated assistant 215 by performing a first action and invoke the second automated assistant 220 by performing a second action. Based on which invocation phrase is uttered and/or which action is performed, the user can indicate which of the multiple assistants that are executing on the client device 105 that the user has interest in processing a spoken query. The example environment further includes a second client device 110 that is executing a third automated assistant 245. The third automated assistant may be configured to be invoked using a third invocation phrase, such as "OK Assistant 3" such that it may be captured by microphone 230. Further, the third automated assistant 245 can be configured to be invoked using a third gesture and/or action that may be captured by camera 250 In some implementations, one or more of the automated assistants of FIG. 2 may be absent. Further, the example environment may include additional automated assistants that are not present in FIG. 2. For example, the system may include a third device executing additional automated assistants and/or client device 110 and/or client device 105 may be executing additional automated assistants and/or fewer automated assistants than illustrated.

In some implementations, one or more automated assistants can be capable of being invoked based on constraints of the devices that are executing the automated assistants. For example, first client device 205 may include a camera to capture gestures of the user, whereas second client device 210 may include a microphone (and not a camera), thus being capable of only identifying audio invocations. In instances wherein a user performs a gesture, the gesture may be identified by first client device 205 and can invoke at least one of the first automated assistant 215 and/or second automated assistant 220. In instances wherein a user utters an invocation phrase, only automated assistants on client devices that include a microphone may be invoked. Thus, in instances where both first automated assistant 215 and third automated assistant 245 are capable of being invoked with the same invocation input, the user can indicate a preference for one of the invocable automated assistants over the other based on the type of invocation input that is detected by one or more of the client devices 205 and 210.

Each of the automated assistants 215, 220, and 245 can include one or more components of the automated assistants described herein. For example, automated assistant 215 may include its own speech capture component to process incoming queries, visual capture component to process incoming visual data, hotword detection engine, and/or other components. In some implementations, automated assistants that are executing on the same device, such as automated assistants 215 and 220, can share one or more components that may be utilized by both of the automated assistants. For example, automated assistant 315 and automated assistant 320 may share an on-device speech recognizer, on-device NLU engine, and/or one or more of the other components.

Figure 3A:
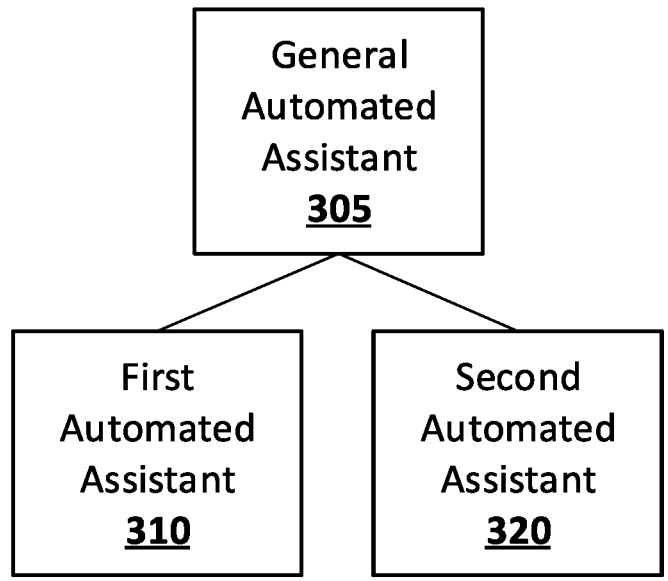
FIG. 3A and FIG. 3B are block diagrams of example implementations of multiple automated assistants.

In some implementations, two or more of the automated assistants may be invoked by the same invocation phrase, such as "OK Assistant," that is not unique to a single automated assistant. When the user utters an invocation phrase and/or provides other invocation input (e.g., a gesture that can invoke two or more of the automated assistants), one or more of the automated assistants may function as a general automated assistant and determine which, of the automated assistants that may be invoked, to invoke based on the invocation input. Referring to FIG. 3A, a general automated assistant 305 is illustrated along with two additional automated assistants 310 and 320. The general automated assistant 305 may be configured to process invocation input, such as an utterance that includes the phrase "OK Assistant" or other invocation input, which may indicate that the user has interest in providing a query to one of multiple automated assistants that can be invoked by the invocation input. As described herein, the general automated assistant 305 may not include all of the functionality of an automated assistant. For example, the general automated assistant 305 may not include a query processing engine and/or functionality to perform actions other than processing invocation input to determine which of multiple automated assistants to invoke. In some implementations, the general automated assistant 305 may include the functionality of other automated assistants and may determine, for invocation input, whether to invoke itself or invoke a different automated assistant that is configured to be invoked by the same invocation input. For example, both general automated assistant 305 and first automated assistant 310 may be configured to be invoked in response to detecting a spoken invocation phrase such as "Hey Assistant," "OK Assistant", and/or "Assistant". General automated assistant 305 can continuously process (e.g., if not in an "inactive" mode) a stream of audio data frames that are based on output from one or more microphones 320 of the client device 301, to monitor for an occurrence of a spoken invocation phrase. While monitoring for the occurrence of the spoken invocation phrase, the general automated assistant 305 discards (e.g., after temporary storage in a buffer) any audio data frames that do not include the spoken invocation phrase. However, when the general automated assistant 305 detects an occurrence of a spoken invocation phrase in processed audio data frames, the general automated assistant 305 can determine whether the invocation input is directed to the general automated assistant 305 or directed to one or more other automated assistants 310 and 320 that can be invoked with the same invocation input.

Automated assistants 305 and 310 can include multiple components for processing a query, once invoked, for example, a local speech-to-text ("STT") engine (that converts captured audio to text), a local text-to-speech ("TTS") engine (that converts text to speech), a local natural language processor (that determines semantic meaning of audio and/or text converted from audio), and/or other local components. Because the client devices executing automated assistants may be relatively constrained in terms of computing resources (e.g., processor cycles, memory, battery, etc.), the local components may have limited functionality relative to any counterparts that are included in any cloud-based automated assistant components that are executing remotely in conjunction with the automated assistant(s).

In some implementations, one or more of the automated assistants may be invoked by one or more gestures that indicate that the user has interest in interacting with the primary automated assistant. For example, a user may demonstrate intention to invoke an automated assistant by interacting with a device, such as pressing a button or a touchscreen, perform a movement that is visible and may be captured by an image capture device, such as camera, and/or may look at a device such that the image capture device can recognize the user movement and/or positioning. When a user performs a gesture or action, the automated assistant may be invoked and begin capturing audio data that follows the gesture or action, as described above. Further, as described above, multiple automated assistants may be invoked by the same invocation input such that a particular gesture may be a common invocation to more than one automated assistant.

In some implementations, one or more automated assistants 305 and 310 may share one or more modules, such as a natural language processor and/or the results of a natural language, TTS, and/or STT processor. For example, referring again to FIG. 2, both first automated assistant 215 and second automated assistant 220 may share natural language processing so that, when client device 105 receives audio data, the audio data is processed once into text that may then be provided to both automated assistants 215 and 220. Also, for example, one or more components of client device 105 may process audio data into text and provide the textual representation of the audio data to third automated assistant 245, as further described herein. In some implementations, the audio data may not be processed into text and may instead be provided to one or more of the automated assistants as raw audio data.

In some implementations, a user may utter a query after uttering an invocation phrase, indicating that the user has interest in receiving a response to the query from a primary automated assistant. In some implementations, the user may utter a query before or in the middle of an invocation phrase, such as "What is the weather, Assistant" and/or "What is the weather today, Assistant, and what is the weather tomorrow." The general automated assistant 305 can process the invocation input (e.g., "Assistant") and other captured audio data (e.g., "What is the weather") to determine which automated assistant to invoke based on features further described herein.

Figure 3B:
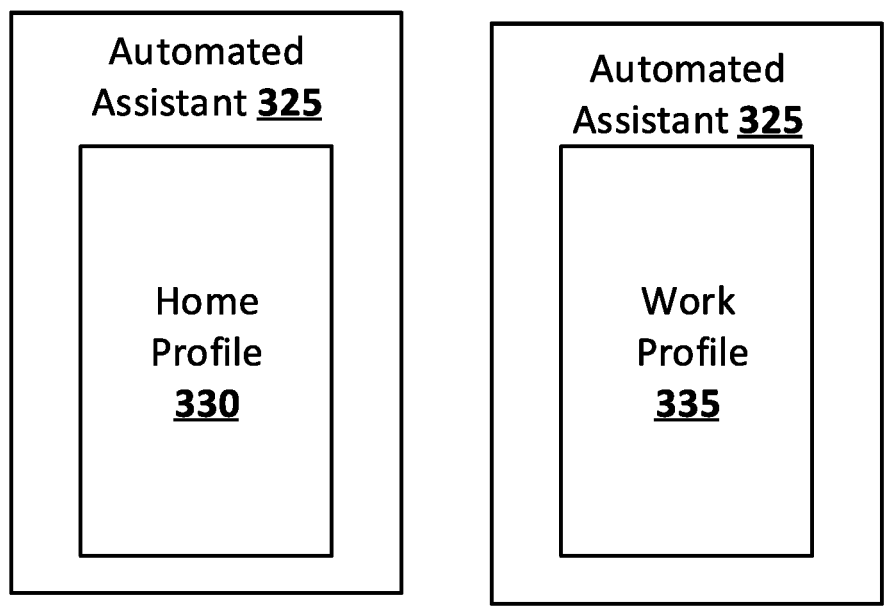

Referring to FIG. 3B, two instantiations of an automated assistant 325 is illustrated, each with a different profile for the same user. The user may configure the two instantiations of the automated assistant 325 such that both are responsive to the same user voice and are both capable of being invoked with the same invocation phrase. However, depending on which instantiation of the automated assistant 325 performs an action, different results may be provided to the user. For example, the user may have a work calendar and a home calendar, each of which operates independently and handles appointments and/or other calendar functionality for particular purposes. When the user has interest in being provided with information from a "work" automated assistant instantiation 325, the user can be provided with information from the "work" profile 335 of the user. Similarly, when the user is interacting with the "home" instantiation of the automated assistant 325, the user can be provided with information from the "home" profile 330 of the user. In some implementations, both automated assistants 325 have the same general invocation input that is capable of generally invoking the automated assistant 325 but does not specify between the instantiations. For example, one or both automated assistants 325 may be invoked with the invocation input "OK Assistant" without specifying whether the invocation is intended for the instantiation with the home profile 330 or work profile 335. Thus, one or both instantiations of the automated assistant 325 can be configured to determine which profile to utilize upon detecting a general invocation phrase, in a manner similar to the general automated assistant 305 of FIG. 3A.

Figure 4:
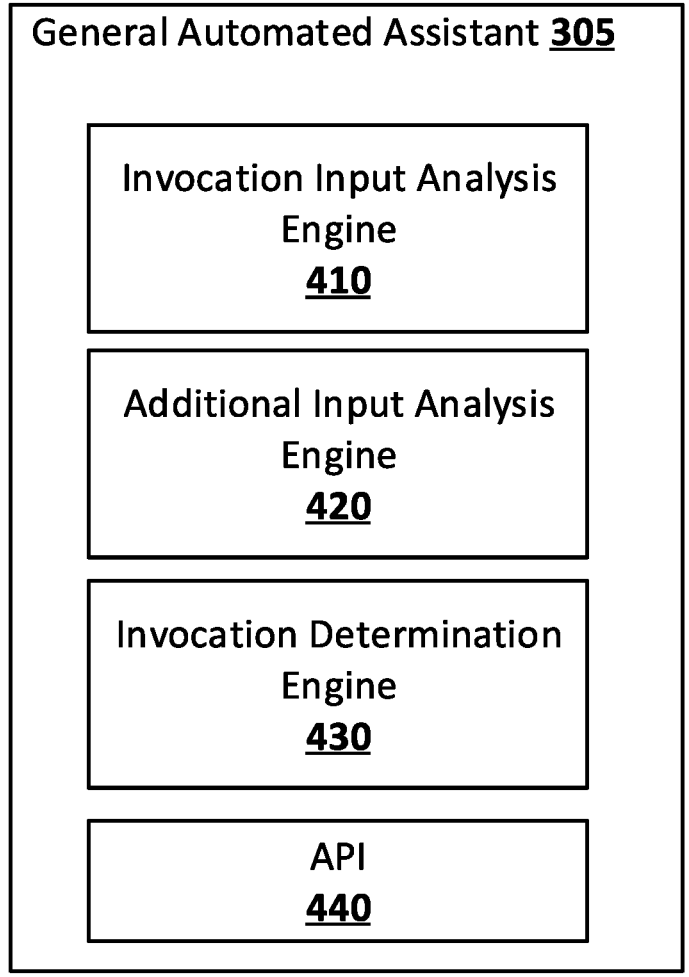
FIG. 4 is a block diagram illustrating components of a general automated assistant in which implementations disclosed herein can be implemented.

Referring to FIG. 4, components of a general automated assistant 305 are illustrated in which implementations described herein can be implemented. Although described herein for an environment whereby a general automated assistant processes invocation input and determines which automated assistant to invoke, components described with respect to general automated assistant 305 may be present in instantiations of automated assistant 325 and be utilized to determine whether to selectively invoke automated assistant 325 utilizing home profile 330 over utilizing automated assistant 325 with work profile 335.

Invocation input analysis engine 410 can process invocation input to determine one or more invocation features that can be utilized to determine which automated assistant to invoke. In some implementations, invocation features can be determined based on general invocation input that is capable of invoking multiple automated assistants. For example, referring to FIG. 3A, general automated assistant 305 can process invocation input of the user uttering an invocation phrase of "OK Assistant" that is capable of invoking both first automated assistant 310 and second automated assistant 320. Also, for example, general automated assistant 305 can process invocation input of the performing a gesture that is captured by one or more cameras and is capable of invoking both first automated assistant 310 and second automated assistant 320.

In some implementations, one or more invocation features can include one or more prosodic features of audio input that includes the invocation input. Prosodic features can include, for example, a tone of the speaker, speech rate, inflection, volume, and/or other features of human speech that can be indications of whether the user intends to invoke one automated assistant in lieu of invoking a second automated assistant. As an example, a user may utilize first automated assistant 310 for non-work purposes, and may, when speaking a general invocation phrase, speak in a more relaxed manner (e.g., slower, friendly, louder). Conversely, a user may utilize second automated assistant 310 for work purposes, and may, when speaking a general invocation phrase, speak in a more formal manner (e.g., quieter, less inflection, more rapidly). Thus, based on processing the user speaking the invocation phrase, invocation features can be determined that may be utilized by invocation determination engine 430 to determine which automated assistant to invoke.

Additional input analysis engine 420 can determine one or more additional features that can be utilized to determine which automated assistant to invoke. In some implementations, additional features can be based on a location that is associated with the client device that is executing the general automated assistant 305. For example, a user may have interest in utilizing a particular automated assistant when at work and a different automated assistant when at home. In instances where both automated assistants are invocable utilizing the same invocation input, the location of the user can be an indication of whether to invoke a first automated assistant (e.g., a work automated assistant) in lieu of invoking a second automated assistant (e.g., a home automated assistant).

In some implementations, a location can be based on a geographic location of the client device that is executing the general automated assistant 305. For example, additional input analysis engine 420 can identify a current location of the client device that is executing the automated assistant based on GPS and determine whether the user has previously indicated that the location is a particular classification of location. Also, for example, additional input analysis engine 420 can identify a current location of the client device that is executing the automated assistant based on WiFi, signal strength of a wireless communication signal, and/or other indication of a location of the device. In some implementations, one or more locations can be associated with a location type, such as "airport" and/or "restaurant." In some implementations, one or more locations can be associated with an area within an identified geographic location, such as a room of a house and/or a particular office of an office building.

In some implementations, a location can be based on a classification of the location where the client device that is executing the general automated assistant 305 is located. For example, a user may be located in a location that has been tagged as an "airport" location and additional input analysis engine 420 can determine that the location is a "public" location based on the type of location. Also, for example, additional input analysis engine 420 can determine that the user is at a location that the user has previously indicated is a "home" location, and additional input analysis engine 420 can determine that the location is classified as a "private" location.

In some implementations, additional features can be determined based on additional audio data that precedes and/or follows the invocation input. For example, additional features can include prosodic features of the user speaking a query that precedes and/or follows the invocation input. Also, for example, additional input analysis engine 420 can determine that, based on word usage, vocabulary selections, and/or other terms that are included in audio data whether the spoken utterance of the user is more closely associated with an intent of the user to invoke a first automated assistant in lieu of invoking a second automated assistant. For example, the user may utilize a more formal vocabulary when uttering a query when intending to utilize a "private" automated assistant and additional input analysis engine 420 can process audio input from the user to determine whether the user's vocabulary selection is more "formal" or more "casual."

In some implementations, additional features can be determined based on background and/or other audio data other than the query and/or invocation that was uttered by the user. For example, if audio data that precedes and/or follows the invocation input includes background noise (e.g., other speakers), an additional feature can be determined that indicates that the user is likely in a public location. Also, for example, is audio data that precedes and/or follows the invocation input includes noise from a television and/or radio, an additional feature can be determined that indicates that the user is more likely in a private setting.

In some implementations, additional features can include features that are determined based on visual input that is received proximate to detecting the invocation input. For example, the client device that is executing general automated assistant 305 can include a camera that can capture visual input while (or proximate to) the user providing invocation input. Additional input analysis engine 420 can determine, based on the visual input, one or more visual input features that can indicate whether the user has interest in accessing one of the invocable automated assistants over another automated assistant.

In some implementations, visual input features can include identifying whether additional users are in proximity of the user when the user provided the invocation input. For example, when the user provides the invocation input, additional input analysis engine 420 can determine, based on captured video, whether the user is alone or whether there are additional people in the vicinity of the user. In some implementations, the presence of others may be an indication that the user intends to access a "public" automated assistant in lieu of accessing a "private" automated assistant.

In some implementations, the user may be provided with an indication of the automated assistant that was invoked when the invocation input was received. In some implementations, the indication can be a visual indication, such as an icon and/or message that is displayed on an interface of a client device of the user. In some implementations, the indication can be audible, such as a synthesized voice indicating the name of the invoked automated assistant and/or a sound (e.g., a beep of a particular frequency) that indicates one automated assistant has been invoked in lieu of invoking another automated assistant. In some implementations, the indication can be a variation in a synthesized speech that is provided to the user by the automated assistant. For example, a first automated assistant may have a synthesized male voice when invoked and a second automated assistant may have a synthesized female voice when invoked such that the user can determine which automated assistant was invoked when multiple automated assistants are capable of being invoked.

Invocation determination engine 430 can determine, based on the processed invocation input and/or additional input features, whether to invoke a first automated assistant in lieu of invoking a second automated assistant. Invocation determination engine 430 can receive the invocation features and/or the additional input features from the invocation input analysis engine 410 and the additional input analysis engine 420, and determine, based on the features, whether to invoke a first automated assistant over invoking a second automated assistant. In some implementations, invocation determination engine 430 can utilize one or more machine learning models to determine which automated assistant to invoke. For example, invocation determination engine 430 can provide a machine learning model with one or more vectors representing invocation and additional features in an embedding space. The machine learning model can provide, as output, probabilities that a first automated assistant is to be invoked and that a second automated assistant is to be invoked.

In some implementations, once an automated assistant has been invoked, additional audio data and/or other data can be provided to the invoked automated assistant. For example, once invoked, general automated assistant 305 can provide a spoken utterance of the user that precedes and/or follows the invocation input. In some implementations, the general automated assistant 305 can communicate with the invoked automated assistant via one or more communication protocols, such as API 440. Also, for example, general automated assistant 305 can communicate via a speaker that is received by the invoked automated assistant at a microphone (e.g., an ultrasonic signal that includes audio data).

In some implementations, general automated assistant 305 can provide audio data that includes the user speaking an utterance. For example, once general automated assistant 305 has determined that a first automated assistant is to be invoked in lieu of invoking a second automated assistant, audio data of the user uttering a query can be directly provided to the invoked automated assistant. In some implementations, general automated assistant 305 can process audio data that includes a spoken utterance of the user prior to providing the audio data and/or additional data to the invoked automated assistant. For example, general automated assistant 305 can process at least a portion of the audio data utilizing STT, natural language processing, and/or automatic speech recognition. The general automated assistant 305 can provide, in addition to or in lieu of the audio data, the processed information to further reduce latency in the invoked automated assistant generating a response for the user.

In some implementations, the user can provide feedback once an automated assistant has been invoked. For example, based on features described herein, general automated assistant 305 may determine that a first automated assistant is to be invoked in lieu of invoking a second automated assistant. The first automated assistant can then be invoked and provided with a spoken query of the user. Further, the user may be provided with an indication that the first automated assistant was invoked. In response, the user may provide a spoken utterance of "No, I was talking to Assistant 2," "I was speaking to the other Assistant," and/or other negative feedback indicating that the incorrect automated assistant was invoked. In response, general automated assistant 305 can invoke the intended automated assistant (and/or the next most likely automated assistant to invoke, in instances wherein the user does not specify the intended automated assistant), and provide the intended automated assistant with the spoken query of the user. Further, one or more of the invocation and/or additional features that were utilized to initially determine to invoke the first automated assistant can be provided, along with a supervised output generated based on the negative feedback, as training data for training a machine learning model that was utilized by invocation determination engine 430. For example, a training example can be generated that includes the feature(s) as input and that includes, as a supervised output, an indication that Assistant 2 should be invoked based on those feature(s). The training example can be used in training the machine learning model. In some implementations, positive feedback from the user can additionally or alternatively be utilized to generate training data for training the machine learning model. For example, if Assistant 1 is invoked based on processing of feature(s) using the machine learning model, and the user continues to interact with Assistant 1 (implicit positive feedback) and/or has explicit positive feedback regarding invoking of Assistant 1, then a training example can be generated that includes the feature(s) and, as supervised output, an indication that Assistant 1 should be invoked.

Figure 5:
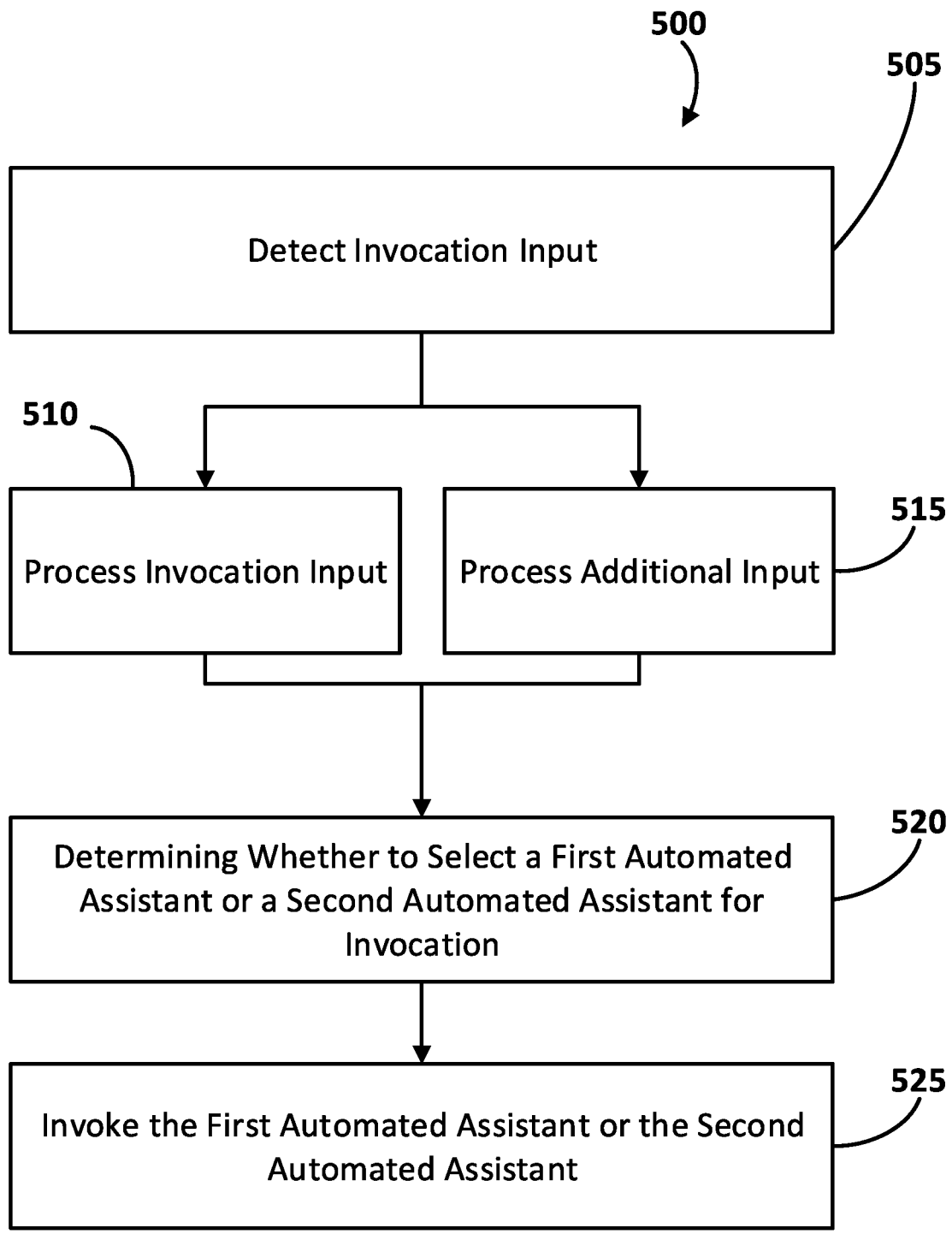
FIG. 5 depicts a flowchart illustrating an example method according to various implementations disclosed herein.

FIG. 5 depicts a flowchart illustrating an example method 500 of selectively determining which automated assistant to invoke. For convenience, the operations of the method 500 are described with reference to a system that performs the operations. This system of method 500 includes one or more processors and/or other component(s) of a client device. Moreover, while operations of the method 500 are shown in a particular order, this is not meant to be limiting. One or more operations may be reordered, omitted, or added.

At step 505, invocation input is detected. In some implementations, the invocation input can be audio input from the user. For example, the invocation input can be the user uttering a particular phrase that, when uttered, is capable of invoking both a first and a second automated assistant. In some implementations, the invocation input can be the user performing one or more actions that are captured by a camera of a device that is executing one or more of the automated assistants. For example, the user may wave in the direction of a client device that is executing both a first and a second instantiation of an automated assistant, both of which are invocable utilizing the same gesture.

At step 510, invocation input is processed to determine one or more invocation input features that can be utilized to determine whether to invoke a first automated assistant in lieu of invoking a second automated assistant. Invocation features can include, for example, prosodic features of the user uttering an invocation phrase. For example, a user may speak with a particular tone, speed, and/or inflection when intending to invoke a first automated assistant and speak with a different tone, speed, and/or inflection when intending to invoke a second automated assistant. Also, for example, in instances where the invocation input is a gesture that is visible via a camera of a client device that is executing one or more of the automated assistants, visual input features can be identified that can indicate a particular automated assistant that the user has interest in invoking (e.g., the presence of other users). In some implementations, invocation input features can be determined by a component that shares one or more characteristics with invocation input analysis engine 410.

At step 515, additional input is processed to determine additional features that can be indications of whether the user has interest in invoking a first automated assistant in lieu of invoking a second automated assistant. Additional features can be determined by a component that shares one or more characteristics with additional input analysis engine 420. Additional features can include, for example, a location and/or classification of a location where the client device of the user is located, visual input indicating the presence of one or more other users when the invocation input was provided, vocabulary and/or terms utilized by the user when providing additional audio (e.g., a query) that precedes and/or follows the invocation input, and/or other features that can indicate an intent of the user to invoke a first automated assistant in lieu of invoking a second automated assistant that is capable of being invoked with the same general invocation input.

At step 520, the output from step 510 and 515 is processed to determine whether to invoke the first automated assistant or the second automated based on the invocation and additional features. In some implementations, the determination is performed by a component that shares one or more characteristics with invocation determination engine 430. For example, invocation determination engine 430 can utilize one or more machine learning models that receive, as input, invocation and additional feature vectors, and provide, as output, probabilities of the user intending to invoke a first and second automated assistant. Based on the output, at step 525, invocation determination engine 430 can invoke a first automated assistant or a second automated assistant, in lieu of invoking the other automated assistant. Once invoked, the invoked automated assistant can be provided with a spoken utterance of the user that precedes and/or follows the invocation input.

In some implementations, once the invoked automated assistant has been provided with a spoken query, the automated assistant can generate a response to the query. Based on user feedback, the second automated assistant can be invoked (e.g., in the case that the user indicates that the incorrect automated assistant was invoked). Feedback from the user can be utilized to further train a machine learning model that can be utilized to determine whether to invoke the first and/or second automated assistant.

Figure 6:
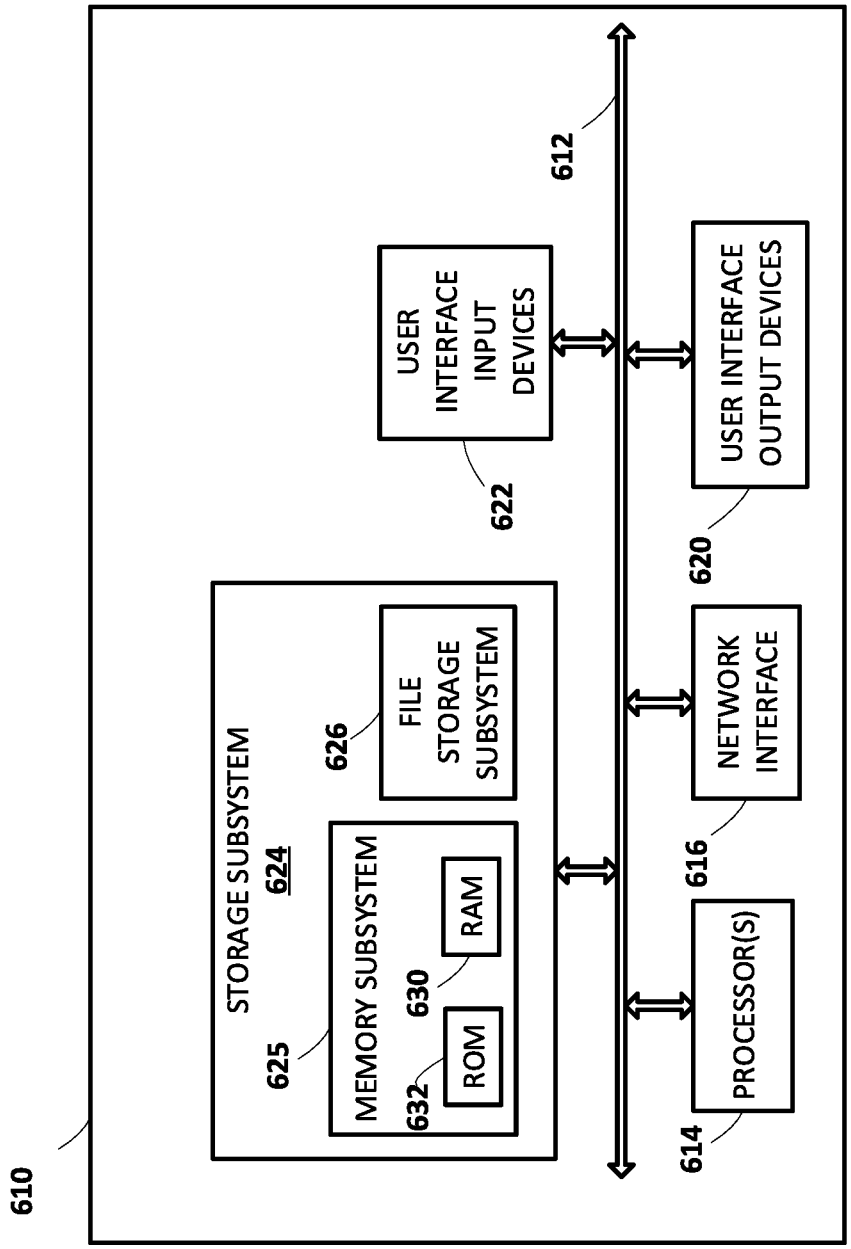
FIG. 6 illustrates an example architecture of a computing device.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method of FIG. 5, and/or to implement various components depicted in FIG. 2, FIG. 3, and FIG. 4.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In some implementations, a method implemented by one or more processors is provided and includes detecting, at a client device, an invocation input that at least selectively invokes a first automated assistant and a second automated assistant, determining whether the invocation input is directed to the first automated assistant or is directed to the second automated assistant, wherein the determining is based on processing at least one of: one or more invocation features of the invocation input, wherein the invocation features are in addition to any features that are based on speech recognition of voice input received in association with the invocation input, and one or more additional features detected by the client device, the one or more additional features being in addition to the invocation features; and in response to determining that the invocation input is directed to the first automated assistant: invoking the first automated assistant in lieu of invoking the second automated assistant.

These and other implementations of the technology disclosed herein can include one or more of the following features.

In some implementations, the one or more invocation features includes one or more prosodic features determined from audio data that includes the invocation input.

In some implementations, determining whether the invocation input is directed to the first automated assistant or is directed to the second automated assistant includes identifying, independent of speech recognition, one or more terms included in audio data that includes the invocation input, and determining that the one or more terms are indicative of an intent of the user to invoke the first automated assistant.

In some implementations, the one or more additional features includes one or more prosodic features determined from audio data detected by one or more microphones of the client device that captures an utterance that precedes or follows the invocation input.

In some implementations, the one or more additional features includes one or more applications executing at the client device within a threshold time period from when the invocation input is detected.

In some implementations, the one or more additional features include a location of the client device when the invocation input is detected.

In some implementations, the one or more additional features includes an activity that the user is performing when the invocation input is detected.

In some implementations, the one or more additional features include one or more visual input features that are based on vision data captured by one or more cameras of the client device when the invocation input is detected.

In some implementations, processing the invocation input includes processing, by the client device, one or more of the invocation features and the additional features using a machine learning model that is stored locally at the client device. In some of those implementations, the method further includes receiving feedback from the user in response to invoking the first automated assistant, wherein the feedback indicates whether the invocation input was intended to invoke the first automated assistant, and training the machine learning model based on the feedback.

In some implementations, the method further includes rendering, at the client device and in response to determining that the invocation input is directed to the first automated assistant, an indication that the first automated assistant has been invoked. In some of those implementations, the method further includes receiving user input in response to invoking the first automated assistant, determining, based on processing the user input, that the user input indicates that the invocation is not directed to the first automated assistant, and in response to determining that the user input indicates that the invocation is not directed to the first automated assistant, invoking the second automated assistant.

In some implementations, the indication comprises a visual indication rendered by a display of the client device. In some of those implementations, the indication comprises an audible indication rendered by a speaker of the client device.

In some implementations, the method further includes providing, to the first automated assistant and in response to invoking the first automated assistant, audio data that precedes or follows the invocation input. In some of those implementations, the audio data is provided without providing additional audio-based data that is based on additional processing of the audio data. In other of those implementations, the method further includes processing the audio data to identify one or more features of the audio data, and providing, to the first automated assistant and in response to invoking the first automated assistant, the one or more features with the audio data.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
   detecting, at a client device, an invocation input that is provided by a particular user, wherein the invocation input, when provided by the particular user, at least selectively invokes a first automated assistant and a second automated assistant;
   determining whether the invocation input is directed to the first automated assistant or is directed to the second automated assistant, wherein the determining is based on processing:
      one or more invocation features of the invocation input, wherein the invocation features are prosodic features of the invocation input and are in addition to any features that are based on speech recognition of voice input received in association with the invocation input, and wherein the prosodic features of the invocation input are indicative of whether the invocation input is directed to the first automated assistant or is directed to the second automated assistant, and
      one or more additional features detected by the client device, the one or more additional features being in addition to the invocation features; and
   in response to determining that the invocation input is directed to the first automated assistant:
      invoking the first automated assistant in lieu of invoking the second automated assistant.

2. The method of claim 1, wherein determining whether the invocation input is directed to the first automated assistant or is directed to the second automated assistant includes:
identifying, independent of speech recognition, one or more terms included in audio data that includes the invocation input; and
determining that the one or more terms are indicative of an intent of the user to invoke the first automated assistant.

3. The method of claim 1, wherein the one or more additional features includes one or more prosodic features determined from audio data detected by one or more microphones of the client device that captures an utterance that precedes or follows the invocation input.

4. The method of claim 1, wherein the one or more additional features includes one or more applications executing at the client device within a threshold time period from when the invocation input is detected.

5. The method of claim 1, wherein the one or more additional features include a location of the client device when the invocation input is detected.

6. The method of claim 1, wherein the one or more additional features includes an activity that the user is performing when the invocation input is detected.

7. The method of claim 1, wherein the one or more additional features include one or more visual input features that are based on vision data captured by one or more cameras of the client device when the invocation input is detected.

8. The method of claim 1, wherein processing the invocation input includes processing, by the client device, one or more of the invocation features and the additional features using a machine learning model that is stored locally at the client device.

9. The method of claim 8, further comprising:
receiving feedback from the user in response to invoking the first automated assistant, wherein the feedback indicates whether the invocation input was intended to invoke the first automated assistant; and
training the machine learning model based on the feedback.

10. The method of claim 1, further comprising:
rendering, at the client device and in response to determining that the invocation input is directed to the first automated assistant, an indication that the first automated assistant has been invoked.

11. The method of claim 10, further comprising:
receiving user input in response to invoking the first automated assistant;
determining, based on processing the user input, that the user input indicates that the invocation is not directed to the first automated assistant; and
in response to determining that the user input indicates that the invocation is not directed to the first automated assistant:
invoking the second automated assistant.

12. The method of claim 10, wherein the indication comprises a visual indication rendered by a display of the client device.

13. The method of claim 10, wherein the indication comprises an audible indication rendered by a speaker of the client device.

14. The method of claim 1, further comprising:
providing, to the first automated assistant and in response to invoking the first automated assistant, audio data that precedes or follows the invocation input.

15. The method of claim 14, wherein the audio data is provided without providing additional audio-based data that is based on additional processing of the audio data.

16. The method of claim 14, further comprising:
processing the audio data to identify one or more features of the audio data; and
providing, to the first automated assistant and in response to invoking the first automated assistant, the one or more features with the audio data.

17. A client device, comprising:
one or more microphones;
memory storing instructions;
one or more processors executing the instructions to:
detect an invocation input that is provided by a particular user, wherein the invocation input, when provided by the particular user, at least selectively invokes a first automated assistant and a second automated assistant;
determine whether the invocation input is directed to the first automated assistant or is directed to the second automated assistant, wherein the determining is based on processing:
one or more invocation features of the invocation input, wherein the invocation features are prosodic features of the invocation input and are in addition to any features that are based on speech recognition of voice input received in association with the invocation input, and wherein the prosodic features of the invocation input are indicative of whether the invocation input is directed to the first automated assistant or is directed to the second automated assistant, and
one or more additional features detected by the client device, the one or more additional features being in addition to the invocation features; and
in response to determining that the invocation input is directed to the first automated assistant:
invoke the first automated assistant in lieu of invoking the second automated assistant.

18. The client device of claim 17, wherein in determining whether the invocation input is directed to the first automated assistant or is directed to the second automated assistant, one or more of the processors are to:
identify, independent of speech recognition, one or more terms included in audio data that includes the invocation input; and
determine that the one or more terms are indicative of an intent of the user to invoke the first automated assistant.

19. The method of claim 1, wherein processing one or more of the invocation features of the invocation input, in determining whether the invocation input is directed to the first automated assistant or is directed to the second automated assistant, comprises:
determining that the prosodic features of the invocation input correspond to prosodic features associated with a prior invocation of the first automated assistant or the second automated assistant.

20. The client device of claim 17, wherein in processing one or more of the invocation features of the invocation input, in determining whether the invocation input is directed to the first automated assistant or is directed to the second automated assistant, one or more of the processors are to:
determine that the prosodic features of the invocation input correspond to prosodic features associated with a prior invocation of the first automated assistant or the second automated assistant.

\* \* \* \* \*